(12) United States Patent
Baird et al.

(10) Patent No.: US 9,527,022 B2
(45) Date of Patent: Dec. 27, 2016

(54) METHOD AND APPARATUS FOR PRODUCING PYROLYSIS OIL HAVING IMPROVED STABILITY

(75) Inventors: Lance A. Baird, Prospects Heights, IL (US); Timothy A. Brandvold, Arlington Heights, IL (US); Stefan Müller, North Vancouver (CA)

(73) Assignee: UOP LLC, Des Plaines, IL (US)

( * ) Notice: Subject to any disclaimer, the term of this patent is extended or adjusted under 35 U.S.C. 154(b) by 996 days.

(21) Appl. No.: 13/492,551

(22) Filed: Jun. 8, 2012

(65) Prior Publication Data

US 2013/0327628 A1    Dec. 12, 2013

(51) Int. Cl.
| | |
|---|---|
| C10B 53/02 | (2006.01) |
| B01D 46/00 | (2006.01) |
| C10J 3/84 | (2006.01) |
| B07B 7/00 | (2006.01) |
| C10L 1/02 | (2006.01) |
| C10K 1/02 | (2006.01) |
| C10K 1/04 | (2006.01) |

(52) U.S. Cl.
CPC ............. *B01D 46/00* (2013.01); *B07B 7/00* (2013.01); *C10B 53/02* (2013.01); *C10J 3/84* (2013.01); *C10K 1/024* (2013.01); *C10K 1/04* (2013.01); *C10L 1/02* (2013.01); *B01D 2273/00* (2013.01); *Y02P 30/20* (2015.11)

(58) Field of Classification Search
None
See application file for complete search history.

(56) References Cited

U.S. PATENT DOCUMENTS

| | | | |
|---|---|---|---|
| 2,429,751 A | 10/1947 | Gohr et al. | |
| 2,892,510 A * | 6/1959 | Wygant | ........................ 55/417 |
| 3,436,898 A | 4/1969 | Kaess et al. | |
| 4,342,574 A * | 8/1982 | Fetzer | ................. B01D 46/00 |
| | | | 55/341.11 |
| 4,348,361 A | 9/1982 | Johnson | |
| 5,401,406 A * | 3/1995 | Johnson | ................ B01D 29/33 |
| | | | 210/323.2 |
| 6,148,599 A * | 11/2000 | McIntosh et al. | ............. 60/781 |
| 7,004,999 B2 | 2/2006 | Johnson et al. | |
| 7,202,389 B1 | 4/2007 | Brem | |
| 7,572,362 B2 | 8/2009 | Freel et al. | |

(Continued)

FOREIGN PATENT DOCUMENTS

| | | |
|---|---|---|
| CN | 101560405 | 10/2009 |
| DE | 3914225 A1 * | 11/1989 |
| DE | 102013016228 A1 * | 4/2014 |

OTHER PUBLICATIONS

English Translation—DE 3914225 A1.*

(Continued)

*Primary Examiner* — In Suk Bullock
*Assistant Examiner* — Jonathan Miller

(57) ABSTRACT

Methods and apparatus to improve hot gas filtration to reduce the liquid fuel loss caused by prolonged residence time at high temperatures are described. The improvement can be obtained by reducing the residence time at elevated temperature by reducing the temperature of the pyrolysis vapor, by reducing the volume of the pyrolysis vapor at the elevated temperature, by increasing the volumetric flow rate at constant volume of the pyrolysis vapor, or by doing a combination of these.

16 Claims, 2 Drawing Sheets

(56) References Cited

U.S. PATENT DOCUMENTS

| | | |
|---|---|---|
| 2009/0227766 A1* | 9/2009 | Bridgwater et al. .......... 530/202 |
| 2011/0213188 A1* | 9/2011 | Agblevor et al. ............ 585/242 |
| 2012/0006051 A1 | 1/2012 | Wilkomirsky Fuica |
| 2012/0012039 A1 | 1/2012 | Palmas et al. |
| 2012/0090221 A1 | 4/2012 | Banasiak et al. |
| 2012/0298920 A1* | 11/2012 | Pavone et al. ................ 252/372 |

OTHER PUBLICATIONS

English Abstract—DE 102013016228 A1.*
Kang et al., "Fast pyrolysis of radiata pine in a bench scale plant . . . ", Journal of Analytical and Applied Pyrolysis, v 76, n 1-2, p. 32-37, Jun. 2006.
Park et al., "Pyrolysis characteristics of Oriental white oak: Kinetic study and fast pyrolysis in a fluidize" Fuel Processing Technology, v 90, n 2, p. 186-195, Feb. 2009.
Kang B S et al: "Fast pyrolysis of radiata pine in a bench scale plant with a fluidized bed: influence of a char separation system and reaction conditions on the production of bio-oil". Journal of Analytical and Applied Pyrolysis, Elsevier BV, NL, vol. 76, No. 102, 2006, pp. 32-37, XPO24998751, ISSN: 0166-2370, DOI: 10/1016/ J/ JAAP. Jun. 12, 2005.
EP Search Report dated Jan. 20, 2016 for corresponding PCT Application No. PCT/US2013/034757.

* cited by examiner

METHOD AND APPARATUS FOR PRODUCING PYROLYSIS OIL HAVING IMPROVED STABILITY

STATEMENT OF GOVERNMENT INTEREST

This invention was made under the partial support of the United States Government, United States Department of Energy under Award No. DE-FG36-08GO18213. The United States Government has certain rights in the invention.

FIELD OF THE INVENTION

This invention relates generally to pyrolysis oil, and more particularly to methods and apparatus for producing pyrolysis oil having improved stability at high liquid yield.

BACKGROUND OF THE INVENTION

Pyrolysis is a thermal process during which solid carbonaceous biomass feedstock, i.e., "biomass", such as wood, agricultural wastes/residues, algae, forestry byproducts, cellulose and lignin, municipal waste, construction/demolition debris, or the like, is rapidly heated to pyrolysis temperatures of about 300° C. to about 900° C. in the absence of air using a pyrolysis reactor. A modern form of pyrolysis, or rapid thermal conversion, is conducted under moderate temperatures, typically 400 to 600° C., and short residence times of less than 5 seconds. An example is RTP or Rapid Thermal Processing that operates under such conditions producing solid and gaseous pyrolysis products. The gaseous pyrolysis products ("pyrolysis gases") comprise a non-condensable portion and a condensable portion (vapors) that can be condensed into liquid biomass-derived pyrolysis oil. The solid pyrolysis products include combustible solids containing carbon, referred to as "char".

Heat for the endothermic pyrolysis reaction is produced in a combustion zone of the process by combusting the char or by combusting the char and the non-condensable pyrolysis gases in the presence of the heat transfer medium. Heat is transferred from the reheater to the pyrolysis reactor by the "heat transfer medium." The heat transfer medium typically comprises inert solids, such as silica sand, low activity catalyst, or other inert material.

In such processes, the heat transfer medium and the solid fuel are typically separated from the gaseous products by a momentum device, such as a cyclonic separator.

However, a portion of the circulating heat transfer medium and the char are too small in diameter to be separated by a momentum device. As a result, after condensation of the liquid pyrolysis oil, the liquid fuel contains some solids from the sand and char that were not separated by the momentum separator. In addition, the char contains some metals from the biomass feedstock, such as sodium, potassium, calcium, and magnesium. These metals contribute to the instability of the liquid fuel in storage. The viscosity increases over time, eventually leading to a separation of the fuel into an organic phase and an aqueous phase. Although possible, it is more difficult to use this high viscosity oil as fuel. The presence of solids in the oil can cause problems. In addition, the oil has to be heated to be used because of the high viscosity, which can cause the oil to solidify and/or accelerate corrosion of the fuel system.

Filtration has been used for separation, either alone or in combination with a momentum separator, to generate a lower-solids content liquid fuel. However, the additional residence time introduced by such filters causes some of the liquid fuel to be converted into gaseous fuel. See, e.g., Kang, et al., Fast pyrolysis of radiate pine in a bench scale plant with a fluidized bed: Influence of a char separation system and reaction conditions on the production of bio-oil, J. Anal. Appl. Pyrolysis 76 (2006) p. 32-37; and Park et al., Pyrolysis characteristics of Oriental white oak: Kinetic study and fast pyrolysis in a fluidized bed with an improved reaction system, Fuel Processing Technology 90 (2009) 186-195.

SUMMARY OF THE INVENTION

One aspect of the invention is an apparatus for producing pyrolysis oil having improved stability. In one embodiment, the apparatus includes a pyrolysis reactor having an inlet and an outlet; a hot gas filter having an inlet and an outlet, the inlet of the hot gas filter in fluid communication with the outlet of the pyrolysis reactor, the hot gas filter including a filter with a filter insert that reduces a void volume of the filter; and a condenser having an inlet, the inlet of the condenser in fluid communication with the outlet of the hot gas filter.

In another embodiment, the apparatus includes a pyrolysis reactor having an inlet and an outlet; a cyclonic separator having an inlet and an outlet, the inlet of the cyclonic separator in fluid communication with the outlet of the pyrolysis reactor; a filter device having an inlet and an outlet, the inlet of the filter device in fluid communication with the outlet of the cyclonic separator; a condenser having an inlet in fluid communication with the outlet of the filter device; and a temperature reducing apparatus in thermal communication with the inlet of the filter device to reduce a temperature of a vapor entering the filter device, or a flow rate increasing apparatus to increase a volumetric flow rate of the first purified pyrolysis vapor stream into the filter device, or both.

Another aspect of the invention involves a method for producing pyrolysis oil having improved stability. In one embodiment, the method includes pyrolyzing biomass in a pyrolysis reactor to form pyrolysis vapor. Particles from the pyrolysis vapor are separated in a hot gas filter forming a purified pyrolysis vapor stream, the hot gas filter having a filter with a filter insert that reduces a void volume of the filter. The purified pyrolysis vapor stream is condensed in a condenser to form the pyrolysis oil.

In another embodiment, the method includes pyrolyzing biomass in a pyrolysis reactor to form pyrolysis vapor; separating particles from the pyrolysis vapor in a cyclonic separator forming a first purified pyrolysis vapor stream; reducing the temperature of the first purified pyrolysis vapor stream, or increasing a volumetric flow rate of the first purified pyrolysis vapor stream into a second filter device, or both; separating particles from the reduced temperature first purified pyrolysis vapor stream in a second filter device forming a second purified pyrolysis vapor stream; and condensing the second purified pyrolysis vapor stream in a condenser to form the pyrolysis oil.

DETAILED DESCRIPTION OF THE INVENTION

The present invention involves methods and apparatus to improve hot gas filtration to reduce the liquid fuel loss caused by prolonged residence time at high temperatures. The improvement can be obtained by reducing the residence time at elevated temperature by reducing the temperature of the pyrolysis vapor, by reducing the volume of the pyrolysis vapor at the elevated temperature, by increasing the volumetric flow rate at constant volume of the pyrolysis vapor, or by doing a combination of these.

Figure 1:
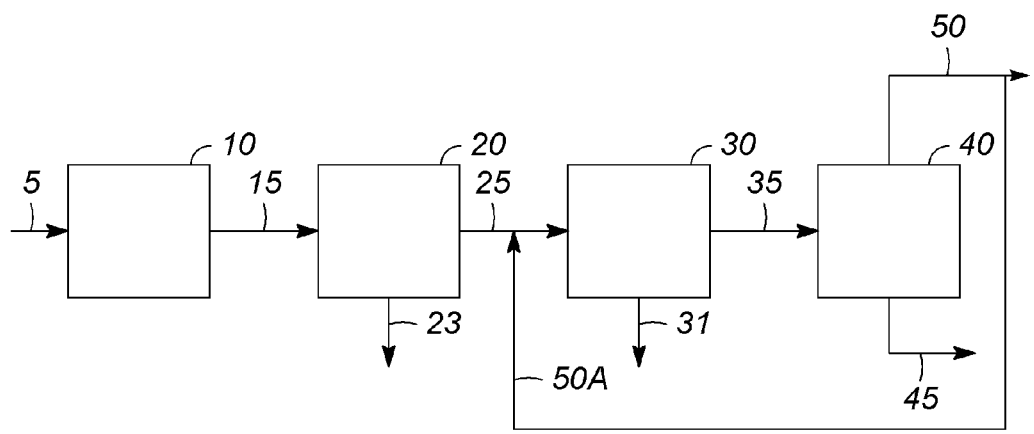
FIG. 1 is an illustration of one embodiment of a process according to the present invention.

FIG. 1 illustrates one embodiment of a pyrolysis system that uses the present invention. Carbonaceous biomass feedstock 5 (hereinafter "biomass") is pyrolyzed in a pyrolysis reactor 10 to form pyrolysis products 15. The pyrolysis products comprise solid and gaseous pyrolysis products. Gaseous pyrolysis products comprise a condensable portion and a non-condensable portion. The condensable portion may be condensed into liquid biomass-derived pyrolysis oil. The solid pyrolysis products include combustible solids containing carbon (also referred to herein as "char").

Some pyrolysis reactors use a heat transfer medium, while others do not. If present, the heat transfer medium comprises inert solids, such as sand, catalytic solids, or both. The heat transfer medium leaving the pyrolysis reactor 10 is said to be "spent" because it contains the combustible carbon-containing solids from the pyrolysis process. The pyrolysis products 15 with entrained spent heat transfer medium, if present, are transferred from the pyrolysis reactor 10 to a momentum separator 20 for separating the gaseous pyrolysis products 25 from the spent heat transfer medium and char particle stream 23. The spent heat transfer medium and char particle stream 23 is sent to the reheater zone of the pyrolysis reactor 10 (or separate combustion zone if present). Suitable momentum separators include, but are not limited to, cyclonic separators.

Some spent heat transfer medium and char particles which are too small to be removed in the momentum separator 20 are carried with the pyrolysis products 25 into the filtration device 30, where the smaller heat transfer medium and char particles are separated out in stream 31 and returned to the pyrolysis reactor 10. Suitable filtration devices include, but are not limited to, hot gas filters.

The pyrolysis products 35 from the filtration device 30 are sent to condenser 40 where the pyrolysis oil 45 is condensed and recovered. There can be one or more condensers, which can be the same type or different types. Suitable condensers include, but are not limited to, surface condensers and liquid contact condensers.

In some embodiments, the filtration device 30 is desirably placed as close as possible to the exit of the cyclonic separator 20 in order to reduce the length of time at the elevated temperature.

In some embodiments, a portion 50A of the gas 50 from condenser 40 can be mixed with the gaseous pyrolysis products 25 from the momentum separator 20 to reduce the temperature of the pyrolysis products. The temperature reduction is sufficient to reduce the rate of thermal reactions causing conversion of the liquid fuel to gaseous fuel, but not enough to cause condensation of the liquid. The temperature is generally reduced up to about 100° C., or up to about 90° C., or up to about 80° C., or up to about 70° C., or up to about 60° C., or up to about 50° C., or up to about 40° C., or up to about 30° C. The temperature is generally reduced at least about 5° C., or at least about 10° C., or at least about 15° C., or at least about 20° C., or at least about 25° C., or at least about 30° C.

In some embodiments, combining a portion 50A of the gas 50 from condenser 40 with the gaseous pyrolysis products 25 from the cyclonic separator 20 also increases the volumetric flow rate of the combined gas stream to filtration device 30, thereby reducing residence time of the gaseous pyrolysis products. In some embodiments, increasing the volumetric flow rate could be done by introducing an additional gas (either without using the gas from the condenser or combined with the gas from the condenser) into the gaseous pyrolysis products stream. In some embodiments, increasing the volumetric flow rate could be done without decreasing the temperature of the gaseous pyrolysis products.

Figure 2:
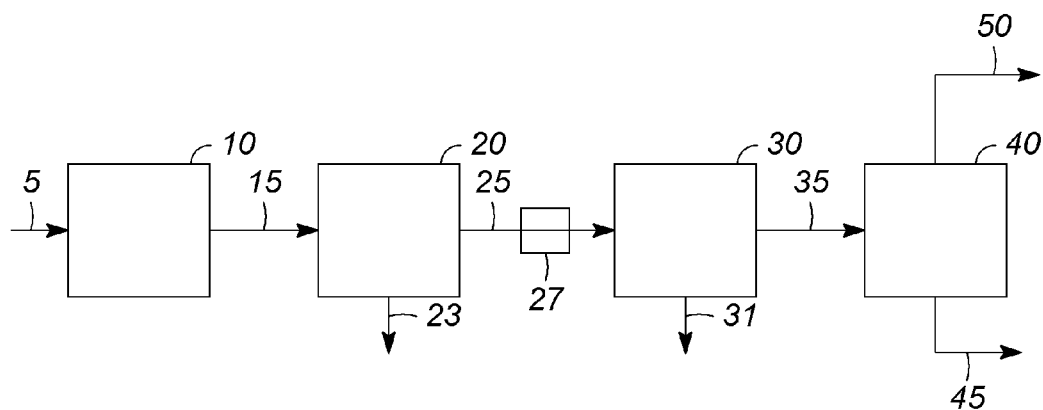
FIG. 2 is an illustration of another embodiment of a process according to the present invention.

Alternatively, the temperature of the pyrolysis products 25 entering the filtration device 30 can be reduced by introducing the pyrolysis products 25 into a heat exchanger 27 as shown in FIG. 2. Other methods of reducing the temperature of the pyrolysis products could also be used.

Figure 3A:
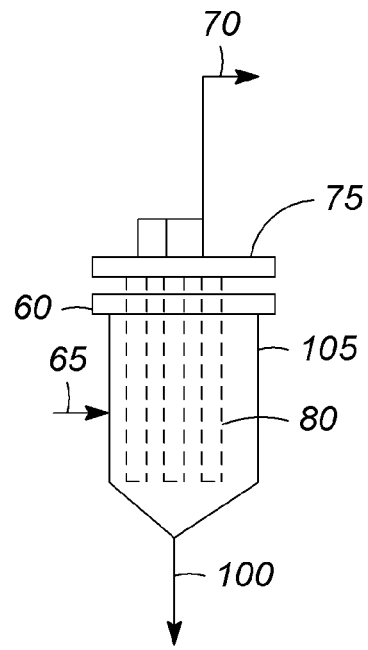
FIGS. 3A-B are illustrations of one embodiment of a hot gas filter including a filter insert.
Figure 3B:
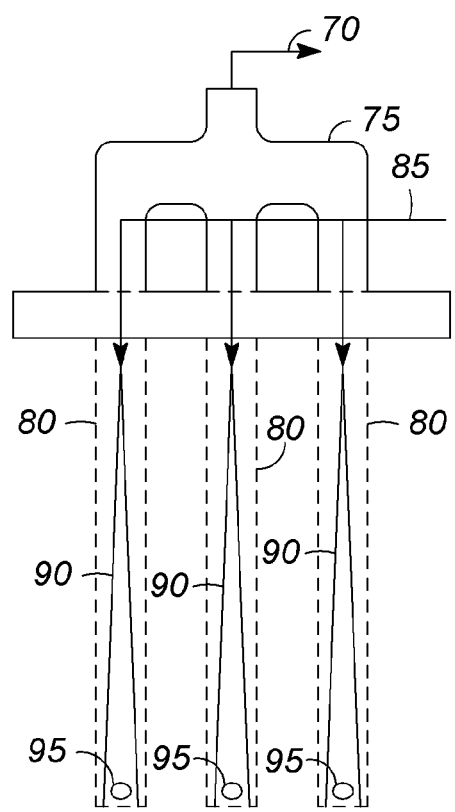

In one embodiment, the pyrolysis reactor 10 does not use a heat transfer medium, and the momentum separator is omitted. In this embodiment, the filtration device 30 is a hot gas filter, such as is shown in FIGS. 3A-B. The inlet of the hot gas filter 30 is connected to the outlet of the pyrolysis reactor 10, and all of the char is removed by the hot gas filter 30. The temperature reducing or volumetric flow rate increasing apparatus can be combined with this embodiment, if desired.

In some embodiments, the filtration device is a hot gas filter 60, as shown in FIGS. 3A-B. The hot gas 65 enters hot gas filter 60 and clean gas 70 exits the hot gas filter 60 after passing through filters 80. The filters 80 have filter inserts 90 which reduce the void volume within the filters 80. Optionally, the interior of the filter insert is purged with a small portion of a quench gas introduced through inlet 85 in manifold 75 and exiting through purge vents 95 in order to prevent damage to the filter insert 90 from a pressure differential or from deposits forming inside the hot gas filter 60. All or a portion of the quench gas can be used for cleaning the filter in the blow back cycle.

The void volume outside the filter 80 within the filter housing 105 is minimized by closely spacing the number of filters 80 within a housing 105 of sufficient diameter to permit filter cake to be adequately discharged 100 during filter regeneration by blow back cycles.

In the embodiment shown in FIG. 3B, the filter inserts 90 are hollow cones. The hollow, conical filter inserts are wider at the base where the gas flow is at a minimum and narrower at the outlet where the gas flow is at a maximum. The tapered shape is designed to minimize the pressure drop across the device. Other filter and filter insert designs are possible, as would be understood by those of skill in the art. For example, if the filters were conical, cylindrical filter inserts could be used. Other examples of cross-sectional shapes for the filter, the filter insert, or both, include, but are not limited to, circles, triangles, squares, rectangles, pentagons, hexagons, heptagons, octagons, nonagons, decagons, stars, etc. The filters and the filter inserts can have the same cross-sectional shape or different cross-sectional shapes. The filters, the filter inserts, or both can be tapered to give conical or pyramidal shapes, for example. The tapered filter or filter insert can be wider at the bottom or wider at the top, if desired.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. Apparatus for producing pyrolysis oil having improved stability comprising:
    a pyrolysis reactor having an inlet and an outlet;
    a hot gas filter having an inlet and an outlet, the inlet of the hot gas filter in fluid communication with the outlet of the pyrolysis reactor, the hot gas filter including a filter with a filter insert that reduces a void volume of the filter, wherein the filter, or the filter insert, or both is tapered to provide a reduced space between the filter and the filter insert at a base of the filter relative to a space between the filter and the filter insert at an outlet of the filter; and
    a condenser having an inlet, the inlet of the condenser in fluid communication with the outlet of the hot gas filter.

2. The apparatus of claim 1 wherein the filter, or the filter insert, or both, has a cross-sectional shape of a circle, a triangle, a square, a rectangle, a pentagon, a hexagon, a heptagon, an octagon, a nonagon, a decagon, or a star.

3. The apparatus of claim 1, further comprising a temperature reducing apparatus in thermal communication with the inlet of the hot gas filter to reduce a temperature of a vapor entering the hot gas filter.

4. The apparatus of claim 3, wherein the temperature reducing apparatus is a vapor outlet of the condenser in thermal communication with the inlet of the hot gas filter, a heat exchanger in thermal communication with the inlet of the hot gas filter, or combinations thereof.

5. The apparatus of claim 1 further comprising a momentum separator having an inlet and an outlet, the inlet of the momentum separator in fluid communication with the outlet of the pyrolysis reactor, the outlet of the momentum separator in fluid communication with the inlet of the hot gas filter.

6. A method for producing pyrolysis oil having improved stability, the method comprising:
    pyrolyzing biomass in a pyrolysis reactor to form pyrolysis vapor;
    separating particles from the pyrolysis vapor in a hot gas filter forming a purified pyrolysis vapor stream, the hot gas filter having a filter with a filter insert that reduces a void volume of the filter, wherein the filter, or the filter insert, or both is tapered; and
    condensing the purified pyrolysis vapor stream in a condenser to form the pyrolysis oil.

7. The method of claim 6 wherein the filter, or the filter insert, or both has a cross-sectional shape of a circle, a triangle, a square, a rectangle, a pentagon, a hexagon, a heptagon, an octagon, a nonagon, a decagon, or a star.

8. The method of claim 6, further comprising reducing a temperature of the pyrolysis vapor.

9. The method of claim 8, wherein the temperature of the pyrolysis vapor is reduced up to about 100° C.

10. The method of claim 8, wherein reducing the temperature of the pyrolysis vapor comprises introducing a portion of a gas from the condenser into the pyrolysis vapor, introducing the pyrolysis vapor into a heat exchanger, or combinations thereof.

11. The method of claim 6, further comprising separating particles from the pyrolysis vapor in a momentum separator before separating particles from the pyrolysis vapor in the hot gas filter.

12. A method for producing pyrolysis oil having improved stability, the method comprising:
    pyrolyzing biomass in a pyrolysis reactor to form pyrolysis vapor;
    separating particles from the pyrolysis vapor in a cyclonic separator forming a first purified pyrolysis vapor stream;
    reducing a temperature of the first purified pyrolysis vapor stream, or increasing a volumetric flow rate of the first purified pyrolysis vapor stream, or both;
    separating particles from the reduced temperature, or increased flow rate, or both first purified pyrolysis vapor stream in a filter device forming a second purified pyrolysis vapor stream wherein the filter device is a hot gas filter including a filter with a filter insert that reduces a void volume of the filter, wherein the filter, or the filter insert, or both is tapered; and
    condensing the second purified pyrolysis vapor stream in a condenser to form the pyrolysis oil.

13. The method of claim 12 wherein reducing the temperature of the first purified pyrolysis vapor stream comprises introducing a portion of a gas from the condenser into the first purified pyrolysis vapor stream, introducing the first purified pyrolysis vapor stream into a heat exchanger in thermal communication with the inlet of the hot gas filter, or combinations thereof.

14. The method of claim 12, wherein the temperature of the first purified pyrolysis gas stream is reduced up to about 100° C.

15. The method of claim 12 wherein the filter, or the filter insert, or both, has a cross-sectional shape of a circle, a triangle, a square, a rectangle, a pentagon, a hexagon, a heptagon, an octagon, a nonagon, a decagon, or a star.

16. The method of claim 12, wherein increasing the volumetric flow rate of the first purified pyrolysis vapor stream comprises introducing an additional gas into the first purified pyrolysis vapor stream.

* * * * *